Nov. 24, 1936.     B. S. AIKMAN     2,061,888
ELECTROPNEUMATIC BRAKE
Filed July 20, 1934     2 Sheets-Sheet 1
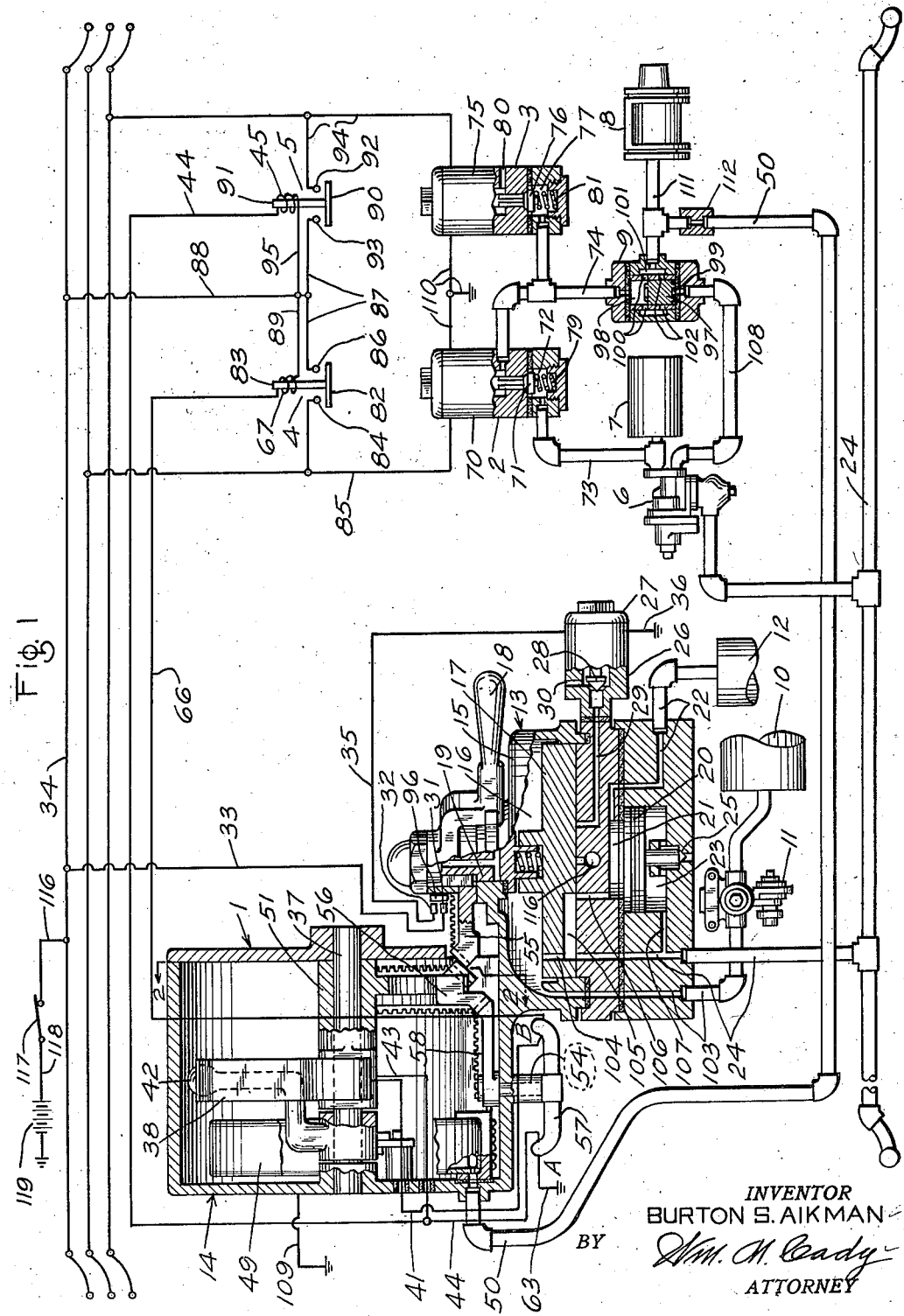
INVENTOR
BURTON S. AIKMAN
BY
Wm. H. Cady
ATTORNEY Nov. 24, 1936.  B. S. AIKMAN  2,061,888
ELECTROPNEUMATIC BRAKE
Filed July 20, 1934  2 Sheets-Sheet 2
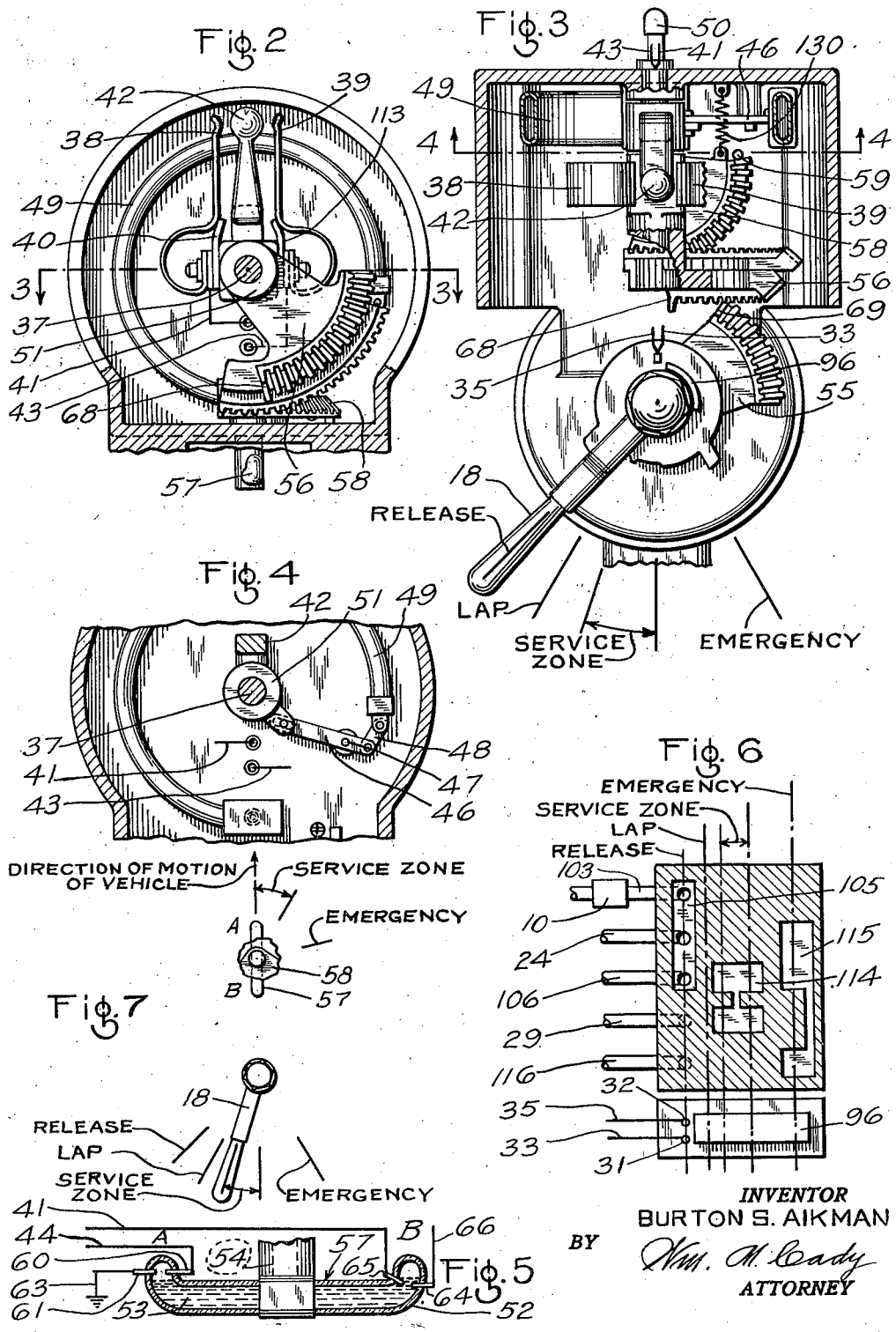
INVENTOR
BURTON S. AIKMAN
BY
Wm. M. Cady
ATTORNEY Patented Nov. 24, 1936

2,061,888

UNITED STATES PATENT OFFICE 2,061,888

ELECTROPNEUMATIC BRAKE

Burton S. Aikman, Wilkinsburg, Pa., assignor to The Westinghouse Air Brake Company, Wilmerding, Pa., a corporation of Pennsylvania Application July 20, 1934, Serial No. 736,190

14 Claims. (Cl. 303—24)

This invention relates to electropneumatic brakes and has for its principal object to provide an electropneumatic brake equipment in which the degree of service brake applications is proportionate to the position of the brake controlling device handle within an application zone.

Another object of the invention is to provide an electropneumatic brake equipment in which the brakes are automatically lapped when the desired degree of brake application is obtained.

Another object of the invention is to provide an electropneumatic brake equipment having inertia controlled means for limiting the maximum rate of retardation obtainable to a degree which varies according to the position of the brake controlling device within an application zone.

A still further object of the invention is to provide an electropneumatic brake equipment in which the rate of retardation is automatically limited by inertia controlled means, which provide for a higher rate of retardation during emergency applications of the brakes than during service applications.

Other objects and advantages will appear from the following more detailed description of the invention.

In the accompanying drawings; Fig. 1 is a diagrammatic view, partly in section, of an electropneumatic brake equipment embodying the invention; Fig. 2 is a sectional view taken on the line 2—2 of the brake controlling device shown in Fig. 1; Fig. 3 is a sectional view taken on the line 3—3 of Fig. 2; Fig. 4 is a sectional view taken on the line 4—4 of Fig. 3; Fig. 5 is a sectional view of the retardation controller; Fig. 6 is a diagrammatic development of the brake valve portion of the brake controllng device, showing the connections established in the various operating positions of the controlling device; and Fig. 7 is a diagram illustrating the positions which the retardation controller assumes, relative to the direction of motion of the vehicle, corresponding to certain operating positions of the operating handle of the brake controlling device.

As shown in Fig. 1, the equipment may comprise a combined brake valve and brake switch device 1, an application magnet valve device 2, a release magnet valve device 3, an application pilot switch device 4, a release pilot switch device 5, a triple valve device 6 of the quick-action automatic type in common use, an auxiliary reservoir 7, a brake cylinder 8, a double check valve device 9, a main reservoir 10, a feed valve device 11, and an equalizing reservoir 12.

Referring to the drawings, the combined brake valve and brake switch device 1 may comprise an automatic brake valve portion 13 and a brake switch portion 14.

The brake valve portion 13 of the combined brake valve and brake switch device 1 may comprise a casing 15 having a valve chamber 16 containing the usual rotary valve 17 adapted to be operated by a handle 18 through the medium of a stem 19. Said brake valve portion also comprises the usual equalizing discharge valve mechanism comprising an equalizing piston 20 having a chamber 21 at one side connected to the equalizing reservoir 12 through a passage and pipe 22 and a chamber 23 at the opposite side connected to the brake pipe 24, and a discharge valve 25 operable by said piston for venting fluid from the brake pipe.

Associated with the brake valve portion 13, preferably mounted thereon, is an interlock magnet valve device 26 comprising a magnet 27 and a valve 28 controlled by said magnet for controlling a passage 29, leading to the seat of the rotary valve 17, and an atmospheric passage 30. The valve 28 is adapted to be seated by the energization of the magnet 27.

A contact member 96 carried by the handle 18, and suitably insulated therefrom, is adapted to engage contacts 31 and 32 in all operating positions of the brake valve portion, with the exception of release position, as shown in Fig. 6. The contact 31 is connected by a wire 33 to a supply wire 34, which is connected by a wire 116 to one terminal of a manually operated switch device 117, the other terminal of said switch being connected by the wire 118 to one terminal of a battery 119, or other suitable source of electric current, the other terminal of said battery being grounded. The contact 32 is connected by a wire 35 to one terminal of the magnet 27, the other terminal of said magnet being connected by a wire 36 to ground.

The brake switch portion 14 of the combined brake valve and brake switch device 1 may comprise a shaft 37 which may have its ends fixed in the casing and which may rotatably carry a sleeve 51 on which are fixed the flexible contact fingers 38 and 39. According to the construction shown in the drawings, said contact fingers are secured to said sleeve at diametrically opposite points and extend outwardly from said sleeve, the ends of said contact fingers being spaced apart transversely of the sleeve. The contact fingers are initially tensioned so that the outer ends thereof are urged toward each other. For insulating said fingers from said sleeve and for defining the normal position of said fingers, the members 40 and 113 are provided which may be fixed to the sleeve 51, the member 40 being adapted to be engaged by the contact finger 38 and the member 113 being adapted to be engaged by the contact finger 39.

The contact finger 38, hereinafter termed application contact finger, is connected by a wire 41 to one terminal of a retardation controller 57, which will be described hereinafter, and the contact finger 39, hereinafter termed release contact finger, is connected by a wire 43 to a wire 44 which connects one terminal of the retardation controller to one terminal of the operating coil 45 of the release relay switch device 5.

Rotatably mounted on the shaft 37 and adapted to rotate independently of the sleeve 51 is a contact 42, the end of which is disposed in the space between but not normally engaging the ends of the contact fingers 38 and 39. The contact 42 is operatively connected to one end of a lever 46 fulcrumed to the casing by means of a pin 47, the other end of said lever being operatively connected, by means of a link 48, to one end of a Bourdon tube 49 of the well known construction as commonly employed in fluid pressure gages. The other end of the Bourdon tube is secured to the casing and is open to a fluid pressure supply pipe 50 which leads to the brake cylinder 8.

For automatically limiting the degree of brake application so as to limit the rate of retardation to a predetermined degree varying according to the operating position of the combined brake valve and brake switch device, a retardation controller device 57 is provided, which may comprise a hermetically sealed tube 52 with upturned ends and containing a body of mercury 53, or other liquid which is a good conductor of electric current, normally extending part way up into the space at the upturned ends. Said tube is carried horizontally at the end of a shaft 54 rotatably mounted in the casing 15, said tube being insulated from said shaft. According to the preferred form of construction, the tube 52 is made of some electrically insulating material, such for example, as glass, molded bakelite, hard rubber, or the like, which has smooth interior walls, so as to permit free movement of the body of liquid 53 contained in said tube.

Extending through the wall at one end of the tube 52 into the interior thereof are two spaced contacts 60 and 61, the contact 60 being connected by the wire 44 to one terminal of the operating coil 45 of the release relay switch device 5, and the contact 61 being connected by a wire 63 to ground. Extending through the wall at the opposite end of said tube into the interior thereof are two spaced contacts 64 and 65, the contact 64 being connected by a wire 66 to one terminal of the operating coil 67 of the application relay switch device 4, the contact 65 being connected by the wire 41 to the application contact finger 38. The end of the tube 52 containing the contacts 60 and 61 will hereinafter be designated the A end and the end containing the contacts 64 and 65 will hereinafter be designated the B end. The circuit from the contact 64 to the contact 65 and from the contact 60 to the contact 61 is adapted to be controlled by the body of liquid 53, as will be understood from the description hereinafter.

The sleeve 51 and the shaft 54 are adapted to be rotated by means of the operating handle 18 of the combined brake valve and brake switch device through the medium of toothed gear segments. Fixed to the stem 19 is a gear segment 55 having teeth adapted to engage the teeth of a gear segment 56 which may be formed on the sleeve 51. A gear segment 58 fixed to the shaft 54 has teeth adapted to engage the teeth of the gear segment 56. In the present embodiment, the gear segments 55, 56 and 58 are of the bevel type, the segment 56 having at one side teeth adapted to engage with the teeth of the gear 55 and having on the opposite side teeth adapted to engage with the teeth of the gear segment 58.

The combined brake valve and brake switch device 1 is provided with a release position, a lap position, a service zone in which, when operating electrically, the degree of a service application of the brakes is automatically limited in accordance with the position of the operating handle and in which the brakes are adapted to be applied pneumatically in the event of failure of the electric current supply, and an emergency position.

In release position of the operating handle 18, the gear segments 55 and 56 are out of mesh, as shown in Fig. 3. For defining the normal position of the gear segments 56 and 58, that is the position of said segments when said handle is in release position, a stop pin 59 is secured to the casing 15 and is adapted to be engaged by the upper edge of the gear segment 58 as viewed in Fig. 3. A coil spring 130 secured at one end to the casing and at the other end to the gear segment 58 acts to maintain said segment in engagement with said stop pin when the operating handle is in release position. It is evident that the gear segment 56, through its engagement with the gear segment 58, will be maintained in normal position when the handle 18 is in release position, and in said normal position the contact 42 is disengaged from the contacts 38 and 39.

As shown in Fig. 3, the end tooth 68 at the left hand end of the toothed section of the gear segment 56 extends beyond the addendum line thereof and is adapted to be engaged by the end tooth 69 at the left hand end of the toothed section of the gear segment 55 when the operating handle 18 has been turned from release position substantially to lap position. Further movement of the handle 18 in a counterclockwise direction will cause the gear segment 55, through the engagement of the teeth 68 and 69, to rotate the gear segment 56 in a clockwise direction, as viewed in Fig. 2, so that teeth thereon will mesh with the teeth of the gear segment 55. As the handle is moved in a clockwise direction from a position in the service zone, or from emergency position, to release position, the consequent movement of the gear segment 55 causes concurrent movement of the gear segment 56 in a counterclockwise direction until, when the handle has been moved to a position just beyond the left hand limit of the service zone, the gear segment 55 will be moved out of meshing engagement with the gear segment 56. Thereafter, while the handle movement is continued to release position, the gear segment 56 will be held in the normal position shown in the drawings by the spring 130 acting on the gear segment 58 to hold said gear segment against the stop pin 59. Thus, lost motion is provided between the gear segments 55 and 56, the object of which will be explained hereinafter.

The normal position of the tube 52 of the retardation controller 57 with reference to the longitudinal axis of the vehicle, or the direction of motion of said vehicle, is such that when the operating handle is moved from release position to the left hand limit of the service zone, said tube will be rotated in a clockwise direction to a position in which, according to the construction shown in Fig. 7, its axis is parallel to the direction of motion of said vehicle, the A end of said tube being disposed forwardly and the B end being disposed rearwardly. It will be understood, however, that the axis of the tube 52, when the handle 18 has been turned to the left hand limit of the service application zone, is not necessarily parallel to the direction of motion of the vehicle but may be disposed at an angle to the direction of motion. Further movement of the handle toward emergency position will effect further rotation of the tube 52 in a clockwise direction, the angularity of the axis of the tube with respect to the direction of motion of the vehicle increasing as the movement is continued, but at no time during the movement of the handle from the left hand limit of the application zone to emergency position will said axis be disposed at right angles to the direction of motion, for a reason which will be explained hereinafter.

The disposition of the contacts 64 and 65 with respect to the level of the body of liquid 53 is such that when said tube has been rotated to a position corresponding to the left hand limit of the service zone, said contacts are submerged to such a depth that the drop in level of said body of liquid at said B end, due to the forward movement of said body under the action of the force of inertia as the speed of the vehicle decreases, will not be sufficient to open the circuit at said contacts until and unless the rate of retardation exceeds a predetermined low degree. When the rate of retardation exceeds said predetermined low degree, then the level of the body of liquid at the B end of said tube will fall until the level is sufficiently low to open the circuit at said contacts.

The contacts 60 and 61 are so disposed with reference to the level of the body of liquid 53 that if the rate of retardation of the vehicle slightly exceeds the rate at which the forward movement of said body opens the circuit at the contacts 64 and 65, the resulting forward movement of said body of liquid will cause the contacts 60 and 61 to become submerged in said liquid and the circuit will therefore be closed at the contacts 60 and 61.

As the angularity of the tube 52 with reference to the direction of motion of the vehicle increases, with the movement of the operating handle 18 toward emergency position, a progressively higher rate of retardation is required to cause sufficient movement of the body of liquid 53 to open the circuit at the contacts 64 and 65 and to close the circuit at the contacts 60 and 61. This is because the force of inertia acting on said body of liquid tending to move same forward from the B end of the tube 52 to the A end thereof, as the speed of the vehicle decreases, being a component of the force tending to move said body of liquid forward in the direction of motion of the vehicle, decreases as the angularity of said tube with respect to the direction of motion of the vehicle increases. As a result, as said angularity increases, a greater rate of retardation is required to obtain a component of sufficient magnitude to change the level of the body of liquid sufficient to open the circuit at the contacts 64 and 65 and to close the circuit at the contacts 60 and 61. It will be understood that at no time during the movement of the handle 18 within the service zone is the tube 52 disposed at right angles to the direction of motion of the vehicle for the reason that in such a position of said tube, the above mentioned component of the force of inertia would be zero, and the retardation controller device would therefore be rendered inoperative.

The application magnet valve device 2 comprises a magnet 70 and a valve 71 adapted to be operated by said magnet. The valve 71 is contained in a valve chamber 72 which is connected to a pipe 73 leading to the auxiliary reservoir 7 and said valve controls communication from valve chamber 72 to a pipe 74 leading to the double check valve device 9. A spring 79 acts to normally maintain the valve 71 seated.

The release magnet valve device 3 comprises a magnet 75 and a valve 76 adapted to be operated by said magnet. The valve 76 is contained in a valve chamber 77 which is connected to pipe 74 and said valve controls communication from valve chamber 77 to an atmospheric passage 80. A spring 81 acts on valve 76 for urging said valve to its seat.

The application pilot switch device 4 controls the energization of the application magnet 2 and may comprise a switch member 82 carried by a solenoid core 83 which is controlled by the operating coil 67. The switch member 82 controls contacts 84 and 86, the contact 84 being connected by a wire 85 to one terminal of the application magnet 70 and the contact 86 being connected by a wire 87 to a wire 88 leading to the supply wire 34. One terminal of the coil 67 is connected by the wire 66 to the contact 64 of the retardation controller device 57, as hereinbefore mentioned, and the other terminal of said coil is connected by a wire 89 to the wire 88.

The release pilot switch device 5 controls the energization of the release magnet 3 and may comprise a switch member 90 carried by a solenoid core 91 which is controlled by the operating coil 45. The switch member 90 controls contacts 92 and 93, the contact 92 being connected by a wire 94 to one terminal of the release magnet 3 and the contact 93 being connected by wire 87 to the wire 88. One terminal of the operating coil 45 is connected by a wire 95 to the wire 88 and the other terminal of said coil is connected by the wire 44 to the contact 60 of the retardation controller device 57.

The double check valve device 9 may comprise a casing provided with a bore containing a floating piston 97 which divides the bore into a pair of chambers 98 and 99, disposed respectively at the upper side and the lower side of the piston 97. The chamber 99 is connected by a pipe 108 to the usual brake cylinder passage (not shown) in the triple valve device 6. In one seating position of the double check valve device, as shown in Fig. 1, the chamber 98 is connected through ports 100 to a chamber 101 and in the opposite position, the chamber 99 is connected through ports 102 to the chamber 101.

In operation, the switch device 117 is moved to closed position so that electric current will be supplied from the battery 119 to the supply wire 34 through wire 118, the switch device 117 and wire 116.

The feed valve device 11 operates in the usual manner to supply fluid at a reduced pressure through pipe and passage 103 to the rotary valve chamber 16 in the combined brake valve and brake switch device 1. With the handle 18 of said device in release position, as shown in Fig. 1, the brake pipe 24 is supplied with fluid under pressure from the rotary valve chamber 16 through the port 104 and cavity 105 in the rotary valve 17 and passage 24. Fluid under pressure supplied to cavity 105 also flows through the passage 106 to the chamber 21 at the upper side of the equalizing piston 20 and from thence through passage and pipe 22 to the equalizing reservoir 12. Fluid at the reduced pressure supplied by the feed valve device 11 to passage 24 also flows therefrom through passage 107 to the chamber 23 at the lower side of the equalizing piston 20. The fluid pressures thus become balanced on the opposite sides of the equalizing piston 20 and said piston operates to maintain seated the discharge valve 25.

Fluid supplied to the brake pipe 24 in the manner above described flows to the triple valve device 6 which is operated thereby to charge the auxiliary reservoir 7 to brake pipe pressure and to connect the pipe 108 leading to the chamber 99 in the double check valve device 9 to the atmosphere.

In release position of the handle 18, the contact 96 on the handle 18 of the combined brake valve and brake switch device is disengaged from the contacts 31 and 32, as shown in Fig. 6, so that the magnet 27 is deenergized. The valve 28 controlled by said magnet performs no function in release position since the passage 29, controlled by said valve, is lapped by the rotary valve 17. With the circuit to said magnet open there is then no waste of electric current.

With the handle 18 in release position, the gear segment 55 is out of mesh with the gear segment 56 and this permits the spring 130 to maintain the gear segment 56 in engagement with the stop pin 59. In this position of the gear segment 56, the contact fingers 38 and 39 are in the normal position, as shown in Fig. 1.

With no fluid under pressure in the brake cylinder 8, the Bourdon tube 49 will assume the normal position shown in Fig. 1 in which position the contact 42 is out of engagement with the contact fingers 38 and 39.

With the contact 42 out of engagement with the application contact finger 38, the circuit to the operating coil 67 of the application pilot switch device 4 is open and as a result the switch member 82 is maintained in the open position, thereby maintaining the magnet 70 of the application magnet valve device 2 deenergized. The deenergization of said magnet permits the spring 79 to maintain the valve 71 seated, thereby closing off communication from the fluid pressure supply pipe 73 to the pipe 74.

With the contact 42 out of engagement with the release contact finger 39, the circuit to the operating coil 45 of the release pilot switch device 5 is open. Said coil is therefore deenergized and the switch member 90 is maintained in the open position, and this results in maintaining the magnet 75 of the release magnet valve device 3 deenergized. The deenergization of said magnet permits the spring 81 to hold the valve 76 seated, thereby closing off communication from the pipe 74 to the atmospheric passage 80.

If it is desired to effect an application of the brakes, the operating handle 18 is turned from release position to any position within the service zone, depending upon the degree of brake application desired, or the rate of retardation desired, as will be understood from the description hereinafter. This movement will cause the gear segment 55 to be rotated in a counterclockwise direction and just before the handle reaches the left hand limit of the service zone the tooth 69 on the gear segment 55 will engage the tooth 68 on the gear segment 56 and further movement of the handle, toward the service zone, will therefore effect movement of the gear segment 56 in a clockwise direction. With the gear segment 56 thus rotated, the application contact finger 38 will be rotated in a clockwise direction from the normal position shown in Fig. 2, and when the handle 18 passes through the left hand limit of the service zone, said contact finger will engage the contact 42. Due to this engagement, the contact finger 38 will be flexed in a counterclockwise direction, away from the stop member 40. The amount of flexure of the contact finger will depend upon the position of the handle 18 within the service zone, it being evident that the farther said handle is moved in a counterclockwise direction, the greater will be said flexure.

With the application contact finger 38 engaging the contact 42, the circuit to the operating coil 67 of the application pilot switch device 4 is closed from the supply wire 34 through wires 88 and 89, the operating coil 67, wire 66, contacts 64 and 65 of the retardation controller device 57, the body of liquid 53, wire 41, contact finger 38, contact 42 and ground wire 109. Flow of current through the coil 67 then causes the solenoid core 83 to operate and shift the switch member 82 so as to bridge the contacts 84 and 86 and thereby close the circuit to the magnet 70 of the application magnet valve device 2, which circuit includes the supply wire 34, wires 88 and 87, contacts 84 and 86 and switch member 82, wire 85, the magnet 70 and the ground wire 110.

The magnet 70 is thus energized, so that the valve 71 is unseated. With the valve 71 unseated, fluid under pressure is supplied from the auxiliary reservoir 7 to the brake cylinder 8 through pipe 73, valve chamber 72, past the valve 71, and thence through pipe 74, chamber 98 in the double check valve device 9, ports 100, chamber 101, and pipe 111, thereby effecting an application of the brakes.

Fluid under pressure supplied to the pipe 111 in effecting an application of the brakes also flows therefrom through pipe 50 to the Bourdon tube 49 of the combined brake valve and brake switch device 1 and as the pressure of the fluid in the tube 49 increases, said tube will tend to straighten out and in so doing will rotate the contact 42 in a clockwise direction. During this movement, the contact finger 38, due to its being flexed, as hereinbefore explained, will remain in engagement with the contact 42 until said contact has been rotated to a position which permits the member 40 to engage the contact finger and stop further movement thereof.

With the application contact finger 38 thus held against further movement, the continued effort of the Bourdon tube 49 to straighten out will cause the contact 42 to move out of engagement with said contact finger and the circuit to the operating coil 67 of the application pilot switch device 4 is thereby opened. The resulting deenergization of said coil permits the switch member 82 to open the circuit to the magnet 70. Said magnet then becomes deenergized and the spring 79 acts to seat the valve 71, thereby cutting off further flow of fluid under pressure to the brake cylinder. Thus, the brake is automatically lapped.

It is evident that the farther the handle 18 is moved into the service zone, from release position, the farther will the sleeve 51 be rotated in a clockwise direction and consequently the greater will be the flexure of the application contact finger 38 due to its engagement with the contact 42. It follows, then, that the contact 42 will have to move a greater distance in order to become disengaged from said contact finger and thereby effect the opening of the circuit to the application magnet 70, and this will require a greater movement of the Bourdon tube 49 which, in turn, requires a greater brake cylinder pressure. Thus, the pressure in the brake cylinder increases as the operating handle 18 is moved farther into the service zone.

If while the brake is applied, fluid under pressure should leak from the brake cylinder, the resulting decrease in pressure of the fluid in the Bourdon tube 49 will permit the spring action of said tube to move the tube toward the normal position and in so doing will rotate the contact finger 42 in a counterclockwise direction until it again engages the application contact finger 38. The circuit to the application pilot switch device 2 is thus closed and the resulting energization of the application magnet 70 will cause the valve 71 to be unseated so as to supply fluid under pressure to the brake cylinder. As the pressure of the fluid in the brake cylinder is thus increased, the Bourdon tube 49 will again tend to straighten out and in so doing will rotate the contact 42 in a clockwise direction out of contact with the contact finger 38 and thereby effect the deenergization of the application magnet 70 so as to cut off further supply of fluid under pressure to the brake cylinder. Thus, brake cylinder pressure is maintained substantially at a pressure corresponding to the position of the application contact finger 38 within a zone corresponding to the service zone of the handle 18.

It is evident from the foregoing that the brakes are applied by the operation of the electric portion of the equipment and during the above described operation, the triple valve device 6 will not operate because, with the electric current supply maintained, the interlock magnet 27 is maintained energized and brake pipe pressure is thereby prevented from reducing, as will be understood from the description hereinafter.

It will be noted that a choke fitting is interposed in the pipe 50, close to the connection of said pipe with the pipe 111. The object of the choke is to reduce the loss of fluid under pressure from the brake cylinder, and thereby prevent a complete loss of the brake, in the event that the Bourdon tube 49 or the pipe 50 should break.

To completely release the brakes, the operating handle 18 is returned to lap position or, preferably, to release position, so as to insure that the brake pipe 24 is maintained charged to feed valve pressure, for a reason which will presently appear. This movement causes the release contact finger 39 to be rotated in a counterclockwise direction, into engagement with the contact 42. It will be remembered that said contact has been rotated, by the straightening out action of the Bourdon tube 49 in effecting an application of the brakes, in a clockwise direction from the position shown in Fig. 2, so that the above mentioned movement of the contact finger 39 into engagement with the contact 42 will result in said finger being flexed in a clockwise direction out of engagement with the stop member 113.

With the contact finger 39 engaging the contact 42, current is supplied to the operating coil 45 of the release pilot switch device 5 through a circuit which includes the supply wire 34, wires 88 and 95, the coil 45, wires 44 and 43, contact finger 39, contact 42 and the ground wire 109. Said coil is thus energized and causes the switch member 90 to bridge the contacts 92 and 93, so that current is supplied from the supply wire to the magnet 75 of the release magnet valve device 3 through wires 88 and 87, the contacts 92 and 93, wire 94, the magnet 75 and the ground wire 110.

The release magnet 75 is thus energized and the valve 76 is unseated, so that the brake cylinder 8 is vented to the atmosphere through pipe 111, chamber 101 of the double check valve device 9, ports 100, chamber 98, pipe 74, valve chamber 77, past the valve 76 and thence through the passage 80.

At this time fluid under pressure is also vented into the vented pipe 111 from the Bourdon tube 49 through the pipe 50, the drop in pressure in said tube reducing at substantially the same rate as the pressure in the brake cylinder 8, since the choke fitting 112 has substantially no retarding effect on the rate of venting of fluid from the tube 49 and pipe 50 because of the small volume of said tube and pipe.

The reduction of pressure in the Bourdon tube 49 permits the spring action of said tube to cause said tube to return toward its normal position. During this movement the contact 42 is moved in a counterclockwise direction and the contact 39, due to its being flexed, as hereinbefore explained, will remain in engagement therewith until said contact has been moved to a position which permits the member 113 to engage said contact finger and stop further movement thereof. At this point, the continued reduction in brake cylinder pressure causes the contact 42 to become disengaged from the release contact finger 39. This will occur just after the handle 18 has been moved beyond the left hand limit of the service zone, or between lap position and the left hand limit of the service zone.

With the contact 42 disengaged from the release contact finger 39, the circuit to the operating coil 45 of the release pilot switch device 5 is open and the resulting deenergization of said coil permits the switch member 90 to open the circuit to the magnet 75. Said magnet then becomes deenergized and the spring 81 acts to seat the valve 76, thereby closing off communication from the brake cylinder 8 to the atmosphere. The deenergization of the magnet 75 and the seating of the valve 76 will occur substantially simultaneously with the return of the Bourdon tube 49, and therefore the contact 42, to normal position.

If, instead of completely releasing the brakes, it is desired to graduate them off, the operating handle 18, instead of being returned to release position, is stopped in the desired intermediate position within the service zone. This causes the release contact finger 39 to engage the contact 42 and to be flexed by said engagement in the same manner as hereinbefore described in connection with a complete release of the brakes. With the contact finger 39 engaging the contact 42, the operating coil 45 of the release pilot switch device 5, and consequently the release magnet 75, becomes energized and causes the valve 76 to be unseated, thereby permitting fluid under pressure to be released from the brake cylinder 8. When the pressure of the fluid in the brake cylinder, and consequently in the Bourdon tube 49 is reduced sufficiently, the contact 42 will be moved out of engagement with the contact finger 39 by the spring action of said tube, and the resulting deenergization of the release magnet 75 permits the valve 76 to be seated, thereby preventing further release of fluid from the brake cylinder. In this manner, the pressure in the brake cylinder may be reduced in steps and a graduated release of the brakes be obtained.

The object in providing the hereinbefore mentioned lost motion between the gear segments 55 and 56 is threefold: First, that when graduating the brakes off, the amount of movement of the operating handle 18 for a given reduction in brake cylinder pressure will be substantially the same when effecting the initial reduction as when effecting subsequent reductions; second, that substantially the same brake cylinder pressure will correspond with a given handle position whether the brakes are being applied or graduated off; and third, that the pressure of the fluid in the brake cylinder may be maintained substantially according to the position of the handle in the service zone when graduating the brakes off, regardless of leakage which would undesirably reduce the pressure of the fluid in the brake cylinder. These objects will now be explained.

According to the construction, as hereinbefore explained, the release contact finger 39 is positioned for effecting a complete release of the brakes when the handle 18 has been moved in a clockwise direction from a position in the service zone to a position just beyond the left hand limit of said zone. Due to the lost motion above referred to, further movement of said handle does not effect movement of said contact finger. If, on the other hand, this lost motion were not provided, then the release contact finger would have to be arranged to assume its normal position, as shown in Fig. 2, in release position of said handle. Similarly, the application contact finger 38 would be arranged so as to be positioned in a normal position when the handle is in release position, but it would be necessary for said application contact finger, when in said normal position, to be spaced away from the contact 42 by a relatively considerable distance, corresponding to the handle movement between release and the left hand limit of the service zone. Then when the handle is moved to a position in the service zone for effecting an application of the brakes, the release contact finger 39 would be spaced away from the contact 42 by a considerable distance instead of by the relatively small distance such as is shown in Fig. 2. It will be seen that when graduating the brakes off, it would be necesary to move the handle a considerable distance before said contact finger would engage the contact 42 to effect the initial reduction in brake cylinder pressure. For each subsequent reduction in brake cylinder pressure when graduating off an application the amount of handle movement would be the same as in the present invention.

It will thus be seen that, when effecting a graduated release of the brakes, a given handle movement would produce less reduction in brake cylinder pressure when effecting the initial reduction in brake cylinder pressure than when effecting subsequent reductions and also that a higher brake cylinder pressure would correspond with a given handle position when releasing than when applying the brakes, both of which features are undesirable.

Assuming that after the initial reduction in brake cylinder pressure effected by the operation of the brake switch portion 14 of the combined brake switch and brake valve device 1 in graduating the brakes off, brake cylinder pressure is further reduced by leakage, then, if the above mentioned lost motion were not provided, the contact 42 would have to travel a greater distance before engaging the application contact finger 38 and thereby preventing further reduction in brake cylinder pressure. Obviously there would be an appreciable reduction of brake cylinder pressure effected through said leakage before said contact and contact finger engage. In other words, brake cylinder pressure would not be maintained, after the initial reduction in pressure, at the pressure to which it is reduced by the manipulation of the handle.

It will be noted from Fig. 6 that when the operating handle 18 is moved to any position within the service zone, a cavity 114 in the rotary valve 17 of the combined brake valve and brake switch device 1 connects passage 29, leading to the interlock magnet 27, with passage 106, which is open to the equalizing piston chamber 21, said chamber being in communication with the equalizing reservoir through passage and pipe 22. As hereinbefore explained, the interlock magnet 27 is maintained energized and the valve 28 seated when the handle 18 is in the service zone. With the valve 28 seated, the pressure of the fluid in the equalizing reservoir 12 is prevented from reducing. However, should the supply of electric current fail for any reason, said interlock magnet will become deenergized and fluid under pressure in passage 29 will unseat the valve 28 and flow to atmosphere through the passage 30. Thus, the pressure of the fluid in the equalizing reservoir is reduced and the equalizing piston 20 then operates in the usual manner to unseat the discharge valve 25 and effect a reduction in brake pipe pressure. This reduction in brake pipe pressure will effect operation of the triple valve device 6 in the usual well known manner to supply fluid from the auxiliary reservoir 7 to the brake cylinder 8 through pipe 108, chamber 99 in the double check valve device 9, ports 102, chamber 101 and pipe 111, it being understood that the pressure of the fluid in chamber 99 will shift the piston 97 to its upper position, thereby opening ports 102 to chamber 99. The brake switch portion 14 of the combined brake valve and brake switch device 1 is rendered ineffective by the failure of the electric current supply. When the desired degree of brake application has been effected, the handle 18 is moved to lap position, so as to prevent further reduction in brake pipe pressure, and the triple valve device will then operate to prevent further increase in brake cylinder pressure.

The brakes may be released, following a pneumatic application as above described, by turning the handle 18 to release position, in which the brake pipe 24 is recharged and the triple valve device 6 is operated to charge the auxiliary reservoir 7 to brake pipe pressure and to connect the pipe 108, and thereby the brake cylinder 8, to the atmosphere in the usual well known manner. The brakes will thereafter be controlled pneumatically in the usual manner until the supply of electric current is restored.

If, when operating pneumatically, it is desired to effect an emergency application of the brakes, the operator will turn the handle 18 to emergency position in which fluid in the brake pipe 24 is vented rapidly through the passage 24, cavity 115 in the rotary valve 17 and the atmospheric passage 116. This rapid venting of fluid from the brake pipe causes the triple valve device 6 to operate to emergency position and supply fluid under pressure to the brake cylinder in the same manner as hereinbefore described in connection with a pneumatic service application of the brakes.

If it is necessary or desirable, for any reason other than failure of the electric current supply, to control the brakes pneumatically, the switch device 117 is moved to and left in open position, after which the brake valve portion 13 of the combined brake switch and brake valve device 1 is operated in the same manner as the usual automatic brake valve device to control the brakes.

When the vehicle is at rest or is traveling at a constant rate of speed, the level of the body of liquid 53 in the tube 52 of the retardation controller device 57 is horizontal, as shown in Fig. 5. When the operating handle 18 is moved into the service zone, the tube 52 is rotated to a predetermined position which varies according to the position of said handle within said zone, as hereinbefore explained, the A end of said tube being forward and the B end thereof being rearward.

When the vehicle is decelerating, the force of inertia will act upon the body of liquid 53 to move it forward in the tube 52, from the B end thereof toward the A end. The consequent change in the level of said body of liquid relative to the contacts 64, 65, 60 and 61, in any given rotational position of the tube 52, will depend upon the rate of retardation of the vehicle. If the rate of retardation exceeds a predetermined degree, the body of liquid will be moved forward in the tube until the level in the B end thereof falls below the contact 64, thereby opening the circuit from the contact 64 to the contact 65. With the circuit thus opened at said contacts, the application pilot switch device 4 becomes deenergized and opens the circuit to the application magnet 70, and the resulting deenergization of said magnet permits the valve 71 to be seated by the spring 79, thereby cutting off further supply of fluid under pressure to the brake cylinder.

As the speed of the vehicle reduces, the coefficient of friction between the brake shoes and wheels increases and the rate of retardation, and therefore the force of inertia acting on the body of liquid 53, increases. The increased force of inertia acting on the body of liquid will cause said body to move forward in the tube 52, thereby raising the level of the liquid in the A end thereof until the contacts 60 and 61 are submerged. With the contacts submerged, the operating coil 45 of the release pilot switch device 5 is energized through a circuit which includes the supply wire 34, wires 88 and 95, the coil 45, wire 44, contacts 60 and 61, and the ground wire 63. The resulting energization of said coil operates the solenoid 91 so as to move the switch member 90 to the closed position, thereby closing the circuit to the release magnet 75. The release magnet thus becomes energized and operates in the manner hereinbefore described to release fluid under pressure from the brake cylinder 8.

When the braking force has thus been reduced to a degree where the rate of retardation is insufficient to maintain the level of the body of liquid 53 at the A end of the tube above the contacts 60 and 61, the resulting drop in the level of the liquid at said end of the tube will cause the circuit at the contacts 60 and 61 to be opened, which will cause the release pilot switch device 5 to operate to open the circuit to the release magnet 75. The resulting deenergization of said magnet permits the valve 76 to be seated by the action of the spring 81, thereby cutting off the venting of fluid from the brake cylinder, so that the brakes are again lapped.

If the rate of retardation should again increase so that the contacts 60 and 61 are again submerged in the body of liquid, a further release of fluid under pressure from the brake cylinder will be effected. If, however, the first or any subsequent release of fluid pressure from the brake cylinder effects a rate of retardation such that the level of the body of liquid will rise at the B end of the tube 52 until the contacts 64 and 65 are again submerged, the application magnet 70 will again be energized and effect a further supply of fluid under pressure to the brake cylinder 8, until the rate of retardation has again been increased to a degree sufficient to cause the body of liquid to open the circuit at the contacts 64 and 65.

As hereinbefore explained, the angularity of the tube 52 with respect to the direction of motion of the vehicle increases as the operating handle 18 is moved in a counterclockwise direction from the left hand limit of the service zone and is greatest when said handle is in emergency position. Thus, for the reason hereinbefore set forth, the rate of retardation required to open the circuit to the application pilot switch device 4 at the contacts 64 and 65 and the rate of retardation required to close the circuit to the release pilot switch device 5 at the contacts 60 and 61 is dependent upon the position of the handle 18, a relatively slow rate of retardation being required when the handle is at the left hand limit of the service zone and a higher rate when the handle is in any position, in a counterclockwise direction, beyond said zone limit, being greatest when the handle is in emergency position. Thus, when it is desired to effect an application of the brakes, the handle is moved in a counterclockwise direction into the service zone in accordance with the desired rate of retardation to be maintained, or is moved to emergency position if it is desired to maintain the maximum rate of retardation, whereupon the retardation controller device 57 will operate in the manner above described to limit the braking force to a degree which will produce the desired rate of retardation.

As the vehicle approaches a stop, the rate of retardation may be controlled by the manipulation of the operating handle 18, so that the vehicle may be brought to a stop smoothly.

It is obvious that if the supply of electric current is cut off, the retardation controller device 57 is rendered ineffective.

It will thus be apparent from the foregoing that the invention provides an electropneumatic brake comprising a controlling device having a switch portion which is self-lapping and a brake valve portion which is automatically rendered operative upon failure of the current supply. The invention further provides an inertia controlled retardation controller device which, when associated with said brake switch portion, controls the braking force so as to limit the rate of retardation to a predetermined degree corresponding to the position of the operating handle of said controlling device within a service zone, and which provides a higher rate of retardation during emergency applications than during service applications.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake for vehicles, in combination, a brake cylinder, means for controlling the supply of fluid under pressure to, and the release of fluid under pressure from, said brake cylinder comprising a manually operable member, electrical control means actuated thereby, means for varying the setting of said electrical control means comprising a pressure responsive means subject to a pressure which corresponds with the degree of application of the brakes, and an inertia controlled device responsive to the rate of deceleration of the vehicle for modifying the action of said electrical control means to limit the rate of retardation of the vehicle to a selected predetermined value.

2. In an electropneumatic brake, the combination with a brake cylinder and a brake pipe, of electrically controlled means for supplying fluid under pressure to said brake cylinder, a valve device operative upon a reduction in pressure in said brake pipe for supplying fluid under pressure to said brake cylinder, a manually operated brake controlling device comprising a brake switch for controlling the operation of said electrically controlled means, a valve operative to effect a reduction in brake pipe pressure upon movement of said brake switch to a position for effecting operation of said electrically controlled means, means operative upon movement of said valve to said position for rendering said valve ineffective, and a handle for operating said brake controlling device.

3. In an electropneumatic brake, the combination with a brake cylinder and a brake pipe, of electrically controlled means for supplying fluid under pressure to the brake cylinder, an automatic valve device operative upon a reduction in pressure in said brake pipe for supplying fluid under pressure to said brake cylinder, a manually operated brake controlling device comprising a brake switch for controlling the operation of said electrically controlled means and a valve operative to effect a reduction in brake pipe pressure upon movement of said brake controlling device to a position for effecting operation of said electrically controlled means to apply the brakes, an electrically operated means operative upon movement of said valve to said position for closing communication from said brake pipe through said manually operated valve for rendering said valve ineffective to effect a reduction in brake pipe pressure.

4. In an electromagnetic brake, the combination with a brake cylinder, of electrically controlled means for controlling the supply of fluid under pressure to the brake cylinder, electric contact members for controlling said electrically controlled means, a manually operable member for controlling the operation of said contact members, a Bourdon tube subject to fluid pressure which varies according to the pressure of fluid applied to the brake cylinder, means operable by said Bourdon tube for also actuating said contact means, and means responsive to the rate of deceleration of the vehicle for also controlling said electrically controlled means.

5. In a brake equipment for vehicles, in combination, a manually operable control means and electrical control means actuated thereby for controlling the application and release of the brakes, means for automatically controlling the degree of application of the brakes comprising a curved tube subject to internal pressure and responsive to the degree of application of the brakes, and additional means for controlling the degree of application of the brakes in accordance with the rate of deceleration of the vehicle.

6. In a fluid pressure brake for vehicles, in combination, a brake cylinder, a manually operable control member and electrical control means actuated thereby for controlling the supply of fluid under pressure to, and the release of fluid under pressure from, said brake cylinder, means for adjusting the setting of said electrical control means for limiting the brake cylinder pressure comprising a curved tube having a closed free end and subject to internal pressure that is responsive to brake cylinder pressure, and inertia responsive means operated in accordance with the rate of deceleration of the vehicle for also controlling the degree of application of the brakes.

7. In a brake equipment for vehicles, in combination, a manually operable control member and electrical means actuated thereby for controlling the application and release of the brakes, means for adjusting the setting of the electrical control means to limit the degree of application of the brakes comprising a curved tube having a closed free end and subject to internal pressure that is responsive to the degree of application of the brakes, and inertia responsive means operated in accordance with the rate of deceleration of the vehicle for also controlling the degree of application of the brakes.

8. In a brake equipment for vehicles, in combination, a manually operable control member and electrical control means actuated thereby for controlling the application and release of the brakes, means for adjusting the setting of said electrical control means to limit the degree of application of the brakes comprising a curved tube subject to internal pressure that is a measure of the degree of application of the brakes and having a closed free end for actuating said adjusting member, and an inertia responsive device operated in accordance with the rate of deceleration of the vehicle for also controlling the degree of application of the brakes.

9. In an electromagnetic brake, the combination with a brake cylinder, of means operative electrically to supply fluid under pressure to said brake cylinder, means operative pneumatically upon a reduction in brake pipe pressure to supply fluid under pressure to said brake cylinder, manually operated means operable to simultaneously effect the operation of both of said means, and means operative electrically to render said manually operated means ineffective to effect a reduction in brake pipe pressure to control the operation of said pneumatically operated means so long as the means operative electrically to supply fluid under pressure to the brake cylinder remains operative.

10. In a fluid pressure brake, the combination with a brake cylinder, of electrically operated means for effecting the supply of fluid under pressure to said brake cylinder, automatically operated means responsive to a reduction in brake pipe pressure for effecting the supply of fluid under pressure to said brake cylinder, manually operated means operated to effect operation of said electrically operated means and to simultaneously effect operation of said automatic means, and means operative to render said manually operative means ineffective to effect the supply of fluid under pressure to said brake cylinder through operation of said automatic means.

11. In an electromagnetic brake, the combination with a brake cylinder, of electrically controlled means for supplying fluid under pressure to said brake cylinder upon a reduction in brake pipe pressure, a manually operated brake controlling device comprising a brake switch for controlling the operation of said electrically controlled means, a valve for controlling the release of fluid under pressure from the brake pipe to effect operation of said pneumatically controlled means, said brake switch being movable to a position for effecting operation of said electrically controlled means simultaneously with movement of said valve to a position for effecting operation of said pneumatically controlled means, means operative upon movement of said valve to said position for rendering the operation of said valve ineffective so long as the electrically controlled means remains operative.

12. In an electromagnetic brake, the combination with a brake cylinder, of means operative electrically to supply fluid under pressure to said brake cylinder, means operative pneumatically upon a reduction in brake pipe pressure to supply fluid under pressure to said brake cylinder, manually operated means operative to simultaneously effect the operation of both of said means, and electrically controlled means adapted to be energized upon the movement of said manually operated means for rendering said manually operated means ineffective to effect a reduction in brake pipe pressure.

13. In a vehicle brake apparatus, the combination with a brake cylinder, of means operative to control the supply of fluid under pressure to and the release of fluid under pressure from said brake cylinder, means comprising a curved tube having a closed free end and subject to internal pressure that is responsive to brake cylinder pressure for controlling said means to limit the degree of application of the brakes, and a control device comprising a mobile body adapted to constantly move in a horizontal direction upon a change in the rate of speed of the vehicle for also controlling the operation of said means to limit the degree of application of the brakes, and means for varying the angularity of the direction of motion of said body with respect to the direction of motion of the vehicle for varying the operation of the first above mentioned means.

14. In a fluid pressure brake for vehicles, in combination, a brake cylinder, a manually operable control member and electrical control means actuated thereby for controlling the supply of fluid under pressure to and the release of fluid under pressure from said brake cylinder, means for limiting the degree of application of the brakes in accordance with the position of said manually operable control member comprising a curved tube having a closed free end and subject to internal pressure that is responsive to brake cylinder pressure, and a control device comprising a movable body adapted to constantly move in a horizontal direction upon a change in the rate of speed of the vehicle for controlling the operation of said electrical control means, and means for varying the angularity of the direction of motion of said body with respect to the direction of motion of the vehicle for varying the operation of said electrical controlled means.

BURTON S. AIKMAN.